United States Patent [19]

Nakashima et al.

[11] 3,981,958

[45] Sept. 21, 1976

[54] GRAFT COPOLYMERS AND PROCESS FOR PRODUCING SAME

[75] Inventors: Kunihiko Nakashima, Gifu; Ryoichi Muroi, Nagoya; Mitsuo Imai, Gifu; Kenji Sato, Tajimi, all of Japan

[73] Assignee: Toyoda Gosei Kabushiki-Kaisha (Toyoda Synthetics Co., Ltd.), Japan

[22] Filed: Apr. 18, 1974

[21] Appl. No.: 462,182

[30] Foreign Application Priority Data

Apr. 19, 1973 Japan.............................. 48-43669
Apr. 19, 1973 Japan.............................. 48-51170
Apr. 19, 1973 Japan.............................. 48-133612

[52] U.S. Cl............................................ 260/878 R
[51] Int. Cl.$^2$................................... C08F 255/06
[58] Field of Search................................ 260/878 R

[56] References Cited
UNITED STATES PATENTS 3,538,190  11/1970  Meredith et al. ............... 260/878 R
3,538,191  11/1970  Meredith et al. ............... 260/878 R
3,538,192  11/1970  Bishop, Sr. ...................... 260/878 R
3,849,518  11/1974  Severini et al. .................. 260/878 R

*Primary Examiner*—Alan Holler
*Attorney, Agent, or Firm*—William J. Daniel

[57] ABSTRACT

A new graft copolymer composed of an ethylene/propylene/non-conjugated diene terpolymer backbone and a homopolymerized or copolymerized methacrylic ester graft moiety. The graft copolymer is produced by grafting a lower alkyl methacrylate alone or in mixture with other ethylenically unsaturated monomer or monomers copolymerizable therewith to an ethylene/propylene/non-conjugated diene terpolymer in the presence of a radical polymerization initiator. The graft copolymer is useful as resinous or rubbery component in a coating or binding composition for treating various inorganic and organic materials including glass and fibers.

12 Claims, No Drawings

GRAFT COPOLYMERS AND PROCESS FOR PRODUCING SAME

BACKGROUND OF THE INVENTION

This invention relates to a new graft copolymer and to a process for producing same. More particularly, this invention relates to a graft copolymer composed of an ethylene/propylene/diene terpolymer backbone having a homopolymerized or copolymerized methacrylic ester graft moiety and to a process for producing same which comprises grafting a lower alkyl methacrylate alone or in mixture with an ethylenically unsaturated monomer or monomers copolymerizable therewith to an ethylene/propylene/diene terpolymer.

In general, the properties of polymers can be modified more or less by grafting a monomeric component to the polymers and the resulting graft copolymers are themselves useful as moldable resins with improved properties for further processing or are suitable, in combination with a proper vehicle, as a treating agent for resins, metals, fibers, glass and the like materials or as a binder for these materials. In fact, the graft polymerization of methyl methacrylate to natural rubber is adopted in the prior art as a means for improving the physical and electrical properties of natural rubber at high temperatures. However, such known graft copolymer was not satisfactory in thermoageing-resisting, weather-resisting and ozone-resisting properties because of the reason that the natural rubber structure constituting the backbone of such natural rubber-methyl methacrylate graft copolymer contains unsaturated bonds.

In order to overcome such disadvantages, many studies have been undertaken and the use of unsaturated bond-free polymers such as chlorinated polyethylene, ethylene/vinyl acetate copolymer, poly(acrylic ester), ethylene/propylene copolymer and poly-isobutylene have been considered as backbone rubbery polymer. However, due to difficulty of graft copolymerization of vinyl monomers to saturated rubbery polymers, the problem has not been solved yet. On the other hand, the graft copolymerization of vinyl monomers to the ethylene/propylene/non-conjugated diene terpolymer is also known. Since this terpolymer is also a saturated rubbery polymer, the graft copolymerization of vinyl monomers to such saturated rubbery polymers hardly takes place. In the prior art techniques, therefore, such graft copolymerization with vinyl monomer is usually carried out after compulsorily oxidizing the saturated backbone polymer with ozone-containing oxygen, oxygen or air under heating (60°–100°C) and then to graft copolymerize the vinyl monomer. (For example, see Japanese Patent Publns. Nos. 16911/65, 6058/68 and 24344/70.

However, such oxidation processes are not desirable because the oxidation of a saturated backbone polymer takes such a long period of time as 2–8 hours and it takes as a whole a considerable period of time until the final product is obtained. In addition, such process involves a number of steps and incurs degradation of the backbone polymer by oxidation.

Thus, there is a great demand for developing a new type graft copolymer which can entirely overcome the drawbacks seen in the prior art graft copolymers.

BRIEF SUMMARY OF THE INVENTION

It is an object of this invention to provide a new graft copolymer having homopolymerized or copolymerized methacrylic ester graft moieties on the backbone of an ethylene/propylene/diene terpolymer.

It is another object of this invention to provide a new graft copolymer which is excellent in thermoageing resistance, weather resistance, ozone resistance and binding property.

It is still another object of this invention to provide a process for the production of a new graft copolymer which comprises grafting a lower alkyl methacrylate alone or in mixture with an ethylenically unsaturated monomer or monomers copolymerizable therewith to an ethylene/propylene/non-conjugated diene terpolymer.

It is further object of this invention to provide a coating composition for treating inorganic and organic materials including wood, metals, plastics, glass and fibers, which comprise the new graft copolymer in a suitable vehicle.

Other and further objects, features and merits of this invention will become apparent more fully as the description proceeds.

DETAILED DESCRIPTION OF THE INVENTION

As the results of many researches made for significantly improving the physical properties of the prior art natural rubber/methyl methacrylate graft copolymer at high temperatures thereby producing a new graft copolymer superior in thermoageing-resisting, weather-resisting and ozone-resisting properties to the prior art graft copolymer, it has now been found that a new graft copolymer which is more excellent in thermoageing-resisting, weather-resisting and ozone-resisting properties than the known conventional graft copolymers is obtained by polymerizing a lower alkyl methacrylate alone or in mixture with an ethylenically unsaturated monomer or monomers copolymerizable therewith in the presence of an ethylene/propylene/non-conjugated diene copolymer by the aid of a radical initiator. It has also been found that if the graft copolymer contains more ethylene/propylene/non-conjugated diene terpolymer moiety than the graft copolymerized poly(-lower alkyl methacrylate)moiety, the graft copolymer will form a transparent, tough and well stretchable rubbery elastomer without a common vulcanization procedure, whereas, if the graft copolymer contains more poly(lower alkyl methacrylate)moiety than the ethylene/propylene/non-conjugated diene terpolymer moiety, the graft copolymer will form a transparent, highly impact-resistant, and tough polymer. It has further been found that the properties of the resulting graft copolymer can be modified by appropriately controlling the conditions for the graft polymerization.

The reason why the graft copolymer of this invention containing a predominant amount of the ethylene/propylene/non-conjugated diene copolymer exhibits elastomeric properties without necessity of any vulcanization procedure is supposed to be ascribable to the fact that the grafted poly (a lower alkyl methacrylate) moieties mutually aggregate and function as pseudorosslinking points below the glass transition point while the molecular chains of the ethylene/propylene copolymer moieties give the property of entropy elasticity. However, this invention is not limited by such theoretical considerations in one embodiment thereof.

It is already known that a block copolymer of a resin-forming monomer and a rubbery polymer-forming monomer is converted into a thermoplastic rubber with the properties of a rubbery elastomer without necessity of any vulcanization treatment. However, it is quite unexpected and surprising from the prior art teachings that a graft copolymer, in which a resin-forming monomer has been grafted to a rubbery polymer in a predominant amount shows the property of rubbery elasticity without necessity of any vulcanization treatment and accordingly the graft copolymer may be used as a rubbery elastomer necessitating no vulcanization treatment.

In accordance with this invention, therefore, there are provided a new graft copolymer composed of an ethylene/propylene/non-conjugated diene backbone and a homopolymerized or copolymerized lower alkyl methacrylate moiety grafted thereto and a process for the production of the graft copolymer which comprises grafting in the presence of a radical polymerization initiator a lower alkyl methacrylate ester alone or in mixture of an ethylenically unsaturated monomer or monomers copolymerizable therewith to an ethylene/propylene/non-conjugated diene.

The modes of graft polymerization used in the process of this invention are not specifically limited, and any one of the modes including bulk polymerization, suspension polymerization, bulk-suspension polymerization, emulsion polymerization and solution polymerization, may be used. If the mode of suspension polymerization is adopted, a conventional suspension stabilizer posessing the properties of a protective colloid such as polyvinyl alcohol, starch, sodium carbonate and sodium polyacrylate may be used. If the mode of emulsion polymerizaton is adopted, anionic surfactants such as higher alcohol sulfates, alkyl aryl sulfonates and alkaline salts of fatty acids or nonionic sufactants such as polyoxyethylene alkyl ethers or esters and sorbitan esters may be used preferably.

According to one embodiment of the process of this invention wherein the ethylene/propylene/non-conjugated diene terpolymer is dissolved in a solvent and the solution polymerization is carried out under usual reaction conditions after addition of the monomer and a radical polymerization initiator, more desirable results are attained and a graft copolymer of extremely high quality can be obtained.

Illustrative of the solvent used in this case are aliphatic hydrocarbon solvents such as pentane, hexane, cyclopentane, cyclohexane, heptane, methylcyclohexane and iso-octane; aromatic hydrocarbon solvents such as benzene, toluene, xylene, ethylbenzene, diethylbenzene and cumene; hydrogenated aromatic hydrocarbon solvents such as tetralin and decalin and chlorinated hydrocarbon solvents such as chloroform, trichloroethylene, perchloroethylene and chlorobenzene. These solvents may also be used as a mixture with any combination and proportion. If necessary, non-dissolving solvents for the ethylene/propylene/non-conjugated diene terpolymer, for example, alcohols such as methyl alcohol and isopropyl alcohol; esters such as methyl acetate and ethyl acetate; ethers such as diethyl ether and diisopropyl ether; ketones such as acetone and methyl ethyl ketone; and other kinds of non-dissolving solvents may be added in a small quantity as viscosity adjusting agent.

During the polymerization reaction, the concentration of the ethylene/propylene/non-conjugated diene terpolymer in the solvent is preferably 2–30% by weight, but such condition is not particularly critical for this invention.

Generally speaking, a lower concentration facilitates stirring of the polymerization mixture but incurs economical disadvantages. On the other hand, a higher concentration makes stirring of the mixture difficult but brings about economical advantages.

The ethylene/propylene/non-conjugated diene terpolymer used in this invention is a rubbery copolymer composed of a diolefin, ethylene and propylene. Some examples of the diolefin include dicyclopentadiene, 1,4-hexadiene, 1,4-heptadiene, 1,5-cyclooctadiene, 6-methyl-1,5-heptadiene, 11-ethyl-1, 11-tridecadiene, 5-methylene-2-norbornene, 5-ethylidene-2-norbornene, 2,5-norbornadiene, 2-methyl-2,5-norbornadiene, methyltetrahydroindene and limonene.

Compounds of norbornene series are particularly desirable as the diolefin.

The weight ratio of the ethylene unit to the propylene unit in the copolymers is 20/80–80/20, prferably 30/70–70/30. Those containing non-conjugated diene are preferred.

The lower alkyl methacrylates used in this invention are represented by the following general formula:

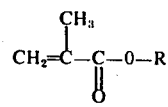

wherein R stands for an alkyl group with 1–3 carbon atoms.

Examples of such methacrylic esters which can be used in this invention include methyl methacrylate, ethyl methacrylte, n-propyl methacrylate and isopropyl methacrylate. If desired, a mixture of these esters may also be used.

In this invention the lower alkyl methacrylate is preferably used in an amount of 1/10–20 times as much as the amount of ethylene/propylene/non-conjugated diene terpolymer. If the amount of the methacrylic ester is too small, an inelastic polymer resembling unvulcanized rubber will be obtained. On the other hand, if the amount is too much, an inelastic, brittle resin will be obtained.

In this invention, the ethylenically unsaturated monomers copolymerizable with the lower alkyl methacrylate ester are not specifically limited. Illustrative of such monomers are monoolefinic aromatic compounds such as styrene and alpha-methylstyrene; olefin cyanides such as acrylonitrile and methacrylonitrile; acrylic esters such as methyl acrylate and butyl acrylate; higher methacrylic esters such as butyl methacrylate and hexyl methacrylate; vinyl halides such as vinyl chloride, vinylidene chloride and vinyl bromide; vinyl esters of fatty acids such as vinyl acetate and vinyl propionate; hydroxyalkyl esters of alpha, beta-unsaturated carboxylic acids such as 2-hydroxyethyl acrylate, 2-hydroxyethyl methacrylate, 2-hydroxypropyl acrylate and 2-hydroxypropyl methacrylate; ethylenically unsaturated monomers having an alkylolamide such as N-methylolacrylamide and N-methylolmethacrylamide; alpha, beta-unsaturated carboxylic acids having one or more carboxyl groups such as acrylic acid, methacrylic acid and itaconic acid; alpha, beta-unsaturated carboxylic amides such as acrylamide and methacrylamide;

ethylenically unsaturated monomers having an epoxy group such as glycidyl acrylate, glycidyl methacrylate and allyl glycidyl ether; and ethylenically unsaturated monomers having an alkoxyalkylamide group such as N-butoxymethylacrylamide and N-butoxymethylmethacrylamide. These copolymerizable monomers may be used in mixture of at least two.

In this invention, the radical polymerization initiators are those known heretofore in the art of polymerization, Examples of such initiators include dialkyl peroxides such as di-tert.-butyl peroxide and dicumyl peroxide; hydroperoxides such as tert.-butyl hydroperoxide and p-methane hydroperoxide; diacyl peroxides such as benzoyl peroxide, and lauroyl peroxide; ketone peroxides such as methyl ethyl ketone peroxide and cyclohexanone peroxide; peroxy esters such as tert.-butyl peroxypivalate and tert.-butyl peroxylaurate; azo compounds such as azo-bis-isobutyronitrile; and persulfates such as ammonium persulfate and potassium persulfate.

If necessary, metallic soaps, tertiary amines or various reducing agents which can activate the initiator may be used conjointly.

In the use of the radical polymerizaton initiator, it is desirable that the half life, the decomposition rate, and the radical formation rate of the radical initiator at various temperatures and its activation energy are taken as criteria of selection, and the most appropriate radical initiator is chosen by taking such factors as polymerizing activity of the monomer, reaction temperature and reaction rate into consideration.

The amount of the radical polymerization initiator should be chosen properly, with consideration being taken for the polymerization conditions and the properties of the graft copolymer to be produced. In general, however, an amount of about 0.01–5% by weight of the monomer is adequate.

These monomers and radical initiators, may be added at one time at the beginning of the polymerization or in several portions at a given interval.

The polymerization temperature should be chosen properly taking into consideration such factors as the kind and amount of both the radical initiator and the monomer and the properties of the desired graft copolymer. Usually, however, the reaction temperature is kept at 50°–150°C, preferably 60°–120°C.

Further, the inside of the polymerization system has better been replaced by dry, pure inert gas such as nitrogen, helium or argon. The presence of such substances as oxygen in the polymerization system is not desirable as it lowers the reaction rate.

Monomers usually used contains a polymerization inhibitor. If necessary, such polymerization inhibitor may be removed prior to polymerization according to any of the usual methods. In this case, removal of the polymerization inhibitor shortens the period of time until the polymerization starts (induction period).

As a method of recovering the graft copolymer from the solution or emulsion after completion of polymerization, any one of the conventional methods utilizing steam blowing, precipitation of graft copolymer with a non-solvent such as methyl alcohol or isopropyl alcohol, dessication by evaporation of the solvent, filtration and rinsing, and precipitation by salting out can be used.

The graft copolymer obtained according to the process of this invention usually contains a homopolymer. If necessary, the homopolymer may be removed by extraction with solvents which dissolve only the homopolymer (for example, acetone or methyl ethyl ketone).

The resulting graft copolymer from which the homopolymer has been removed by extraction does not contain any resinous components which are not bound to the backbone polymer. Accordingly, permanent elongation, stress relaxation and repulsion elasticity of the graft copolymer are greatly improved. Moreover, the degree of whitening at the time of stretching is improved. Thus, such extraction treatment is particularly useful in the case of producing a rubbery elastomer which does not require vulcanization. If the production of a resinous graft copolymer containing the lower alkyl methacrylate moiety ester in an amount greater than the ethylene/propylene/non-conjugated diene terpolymer is intended, the extraction treatment is of little value. By removing the homopolymer by extraction, the degree of elongation is significantly increased with concurrent decrease of modulus. Determination as to whether the extraction treatment should be carried out or not will be done according to the desired physical properties. Although such physical properties as tensile strength, elongation and modulus can be varied by proper selection of the conditions for graft copolymerization, hardness and modulus can be increased suitably by incorporating the graft copolymer with such inorganic fillers as carbon black or calcium carbonate or by introduction of crosslinking with a peroxide, sulfur or a photosensitizer. By addition of an appropriate amount of a plasticizer, for example, a processed oil belonging to the group of paraffin, naphthene, or aromatics; a dialkyl ester of phthalic acid such as dibutyl phthalate or di(2-ethylhexyl) phthalate; a dialkyl ester of adipic or sebacic acid such as di-2-ethylhexyl adipate or di-2-ethylhexyl sebacate;hardness or modulus of the copolymer can be decreased while maintaining its elastic properties.

As to the physical properties of the graft copolymer obtained by the process of this invention, tensile or strength can be varied within the range of 100–400 kg/cm$^2$, elongation within the range of 5–1500%, and 300% modulus within the range of 10–200 kg/cm$^2$, by properly selecting the conditions for graft copolymerization according to the desired properties of the final products.

In the production of graft copolymers having rubbery elasticity in accordance with the process of this invention, it has now been found surprisingly that a tough, transparent graft copolymer which is never whitened at the time of stretching can be obtained, without necessity of any usual vulcanization treatment and removal of the coexistent homopolymer, by appropriately controlling the conditions for graft polymerization.

In case a monomer is subjected to a radical polymerization in the presence of a high molecular substance, a homopolymer of the monomer not bound to the high molecular substance is generally produced in addition to the graft copolymer aimed at. When the resulting graft copolymer is a hard resinous substance, there would be no trouble in practical utilization of the graft copolymer even if it contains the homopolymer. When the graft copolymer is a soft rubbery substance, however, there would be some problems in the use of such rubbery copolymer, especially in the case of containing the hompolymer. For example, the rubbery graft copolymer containing the homopolymer will be whitened on stretching and become poor in physical properties including permanent elongation, repulsive elasticity and stress relaxation. In case the graft copolymer is a rubbery one containing the homopolymer, therefore, there is necessity of subjecting it to an extraction treatment with a solvent capable of dissolving the homopolymer alone, thereby improving the physical properties of the graft copolymer. On the other hand, a special technique such as graft copolymerization by actinic ray irradiation is already known as a means for producing graft copolymers without permitting the concurrent formation of homopolymers. However, this special technique necessitates the use of a large scale apparatus or equipment, thus causing much trouble in putting into practice. When the process of the present invention is carried out under a specifically controlled condition for producing a rubbery product, the desired graft copolymer is efficiently produced and at the same time the formation of undesirable homopolymer is satisfactorily suppressed.

In accordance with another embodiment of the process of this invention, a graft copolymer which is tough and transparent and has rubbery elasticity can be obtained by adjusting the ratio by weight of (a) the lower methacrylic ester to (b) the ethylene/propylene/non-conjugated diene terpolymer to a range of 0.6–1.2 (i.e. (a)/(b) = 0.6–1.2) and by conducting solution graft polymerization after adjusting the concentration of (b) in the solution to at least 120 g/liter. The graft copolymer thus obtained is never whitened on stretching without necessity of removal of the homopolymer and has rubbery elasticity without usual vulcanization.

In this embodiment, the ratio of the reactants and the concentration of the starting terpolymer are both critical for obtaining the desired product. In the event the concentration of the terpolymer (b) in a solvent such as toluene is less than 120 g/liter, the resulting graft copolymer will be whitened on stretching unless the concurrently formed homopolymer be removed by extraction, regardless of how the ratio (a)/(b) is changed. On the other hand, if the ratio (a)/(b) is less than 0.6 or higher than 1.2, the resulting copolymer, even if it were produced under such condition that the concentration of the terpolymer (b) is at least 120g/liter, is poor in toughness and also in physical properties in unvulcanized state in the former case (i.e. (a)/(b) < 0.6) or is satisfied in physical properties but is whitened on stretching in the latter case (i.e. (a)/(b) > 1.2).

Once the ratio (a)/(b) is adjusted to a range of 0.6–1.2, no upper limit exists in the concentration of the terpolymer (b) so long as it is at least 120g/liter. In case the solution is maintained at a relatively low concentration, a reactor equipped with a stirrer is efficiently used for the graft polymerization. If the solution is maintained at a relatively high concentration, an apparatus with a high torque agitation device such as kneader is effectively used as reactor for the graft polymerization. The reactor for the graft polymerization is properly selected according to the concentration of the terpolymer used.

The reason why the rubbery graft copolymer obtained according to this embodiment is never whitened notwithstanding a homopolymer anticipated to be present in the graft copolymer is not removed, is supposed to be ascribable to the fact that such homopolymer is not or scarcely formed in the course of the graft polymerization and the reaction itself proceeds smoothly with high efficiency. However, this invention is not limited by such theoretical consideration.

By controlling the conditions for the graft copolymerization suitably, the products with desired physical properties including those having a soft rubber-like appearance, a tensile strength of 120 kg/cm$^2$, an elongation of 750 % and a 300 % modulas of 20 kg/cm$^2$ and those having a hard rubber-like appearance, a tensile strength of 250 kg/cm$^2$, an elongation of 300 % and a 300 % modulas of 200 kg/cm$^2$ can be obtained.

The graft copolymers obtained by this invention can be used without performing any chemical crosslinking treatment. If necessary, however, a crosslinking agent such as a peroxide or sulfur or a photosensitizer can be used to introduce adequate crosslinkages into the graft copolymer thereby further improving the solvent-resisting, heat-resisting and abrasion-resisting properties of the end products. Prior to the use of the graft copolymers for various purposes, they may be incorporated with various additives such as various stabilizers against ultraviolet rays, ozone, oxygen and heat; organic an inorganic coloring agents such as dyes and pigments; plasticizers and fillers. These additives are selected suitably according to the intended use of the products and mixed therewith in solution or mechanically by the aid of a roll kneader or a Bambury mixer.

The graft copolymers produced according to this invention can be used in a wide variety of industrial fields as far as the intended use meets the purpose for taking advantage of the useful properties of the graft copolymers such as thermoageing-resistance, weather-resistance and ozone-resistance. Products which can be molded by injection, compression, calendering, extrusion, blowing and immersion, are included in the objects to which the graft copolymers of this invention are applicable.

As the graft copolymers of this invention is easily soluble in aromatic hydrocarbon solvents and halogenated hydrocarbon solvents, the graft copolymers in combination with such solvents are particularly suitable for the purpose of coating, for example, as general coating agents including topcoating and subcoating agents, paints, surface-treating agents, sealing agent, etc. and for the purpose of bonding, for example, as binders or adhesives for glass, wood, metal and fibers. The graft copolymers of this invention have such special structure wherein a polar monomer has been graft copolymerized to a non-polar high molecular backbone. Thus, the graft copolymer of this invention is applicable not only to polar high molecular materials but also to non-polar high molecular materials which have been difficult hitherto to be painted, coated or bound, such as polyethylene, polypropylene, ethylene/propylene/non-conjugated diene terpolymer, polyisobutylene, isoprene/isobutylene copolymer, polybutadiene, styrene/butadiene copolymer, polyisobutylene and polystyrene, without any trouble.

The graft copolymers of this invention are particularly useful for painting, coating or binding paper, fibers, glass, metal and wood, but the conjoint use of a suitable primer is preferred.

Hitherto, various synthetic resins have been proposed, in addition to cellulosic derivatives, as resinous component for paints. These synthetic resins involve alkyd resins, polyester resins, epoxy resins, polyurethanes and acrylic resins. However, these conventional resins are inferior in one or more of the thermoageing-resistance, solvent-resistance, weather-resistance, impact-resistance, toughness, coloration-resistance, chemicals-resistance and ozone-resistance. The drawback of the conventional resins is entirely overcome by the use of the graft copolymer of this invention.

The graft copolymer of this invention is dissolved in an aromatic hydrocarbon such as benzene, toluene, xylene, ethylbenzene or cumene or in a halogenated hydrocarbon such as chloroform, carbon tetrachloride or trichloroethylene, or is dispersed in a usual manner into water to prepare a coating or painting composition in the form of a solution or an aqueous emulsion. The hydrocarbon solvents may be used alone or in mixture of at least two. The nature of the graft copolymer utilizable for such coating or painting composition can be modified from a soft rubbery state to a hard resinous state by adequately controlling the conditions for the graft copolymerization.

Conventional paints for rubber fail to possess both weather-resistance and cold-resistance. By using the graft copolymer according to this invention as resinous or rubbery component, an excellent paint composition for rubber without such disadvantages is obtained.

More precisely, by coating rubbers having an inferior ozone-resistance, such as natural rubber, styrene/butadiene copolymeric rubber and butadiene rubber, with a paint comprising the graft copolymer of this invention, the rubbers can be made as ozone-resistant as the ethylene/propylene/non-conjugated diene terpolymer. A coated film of the graft copolymer of this invention is comparable in cold-resistance with natural rubber. As the break-down elongation of this graft copolymer is remarkably larger than that of conventional paints for rubber, the graft copolymer has good compliance with the shape of the substrate. Accordingly, the film of the graft copolymer is not deteriorated in adhesiveness nor forms cracks and wrinkles even in highly stretched state, thus greatly improving adhesiveness of a coated film to substrates. Good adhesiveness of the coated film is proved by the fact that even if the rubber substrate is cut off, the film portion adheres without significant change. As the paint can be varied in hardness from soft rubbery one to hard resinous one, a paint suitable for the desired purpose can be selected properly. By applying the paint onto resins, it is also possible to improve their weather-resistance and impact-resistance and to add aesthetically designing effects to the resins. Even in the case of a hard paint for coating resins, it contains rubbery component imparting toughness to the paint and so does not crack by shocks. In the case of conventional paints for rubber, they require vulcanization which result in complicate procedures of production and higher costs. In the case of the paint containing the graft copolymer of this invention, it forms a rubbery elastomer with little permanent deformation simply by evaporating the solvent instead of crosslinking by heat and so the procedure for production becomes simpler and the cost also becomes lower.

If a coloring agent and a filler are absent, the paint is useful as clear paint giving luster with good weather-resistance, thermoageing-resistance and ozone-resistance. When a coloring agent or other kinds of materials which produce changes in appearance are added, paints with good designing effects in addition to the above-mentioned characteristics are obtained. For example, addition of fine powders of aluminum produces a paint for rubber with metallic luster. Since such metal-containing film can cut off radiant heat, such film is useful in coating thermoprotective products such as firemen's coats. A paint of this type can also be used to coat the rubber products in engine rooms of cars in order to increase their thermoresistance. By applying the graft copolymer of this invention as coating or bonding agent to corrugated cardboard or other kinds of paper, various technical problems which have hitherto been present in these products can be solved advantageously. Conventional methods for production of water-resistant corrugated cardboard employ parafin or a mixture of parafin and one or more of synthetic resins. However, the products manufactured by such conventional methods had various disadvantages. For example, if the cardboard is bent, it breaks or cracks at the bent part and permits penetration of water therefrom, thus resulting in loss of water-resistance. Further demerits of such cardboard are that it has no sufficient affinity to adhesive tapes, hardly accept printing inks and tends to slip when boxes made of such cardboard are piled up. When the paint comprising the graft copolymer of this invention is used for painting corrugated cardboard, the resulting product will not crack nor break in usual handling and will hardly slip even in the event a few carton boxes made of such cardboard are piled up. This is very convenient for storage or transport of materials. Cardboard treated with the graft copolymer of this invention has a good affinity to adhesive tapes.

The graft copolymer of this invention can be applied to wall paper or slide screen paper to improve its quality significantly. In the manufacture of reinforced paper, incorporation of synthetic fiber staple is often adopted in the prior art. However, incorporation of paper with synthetic fibers for the purpose of reinforcement induces disadvantages in some cases; when synthetic resin or fiber-incorporated paper is used for the purpose of interior decoration, it often gives undesirable glare surface. Especially in the case of slide screen paper, the characteristic appearance of Japanese paper is lost to lower the commercial value. A method wherein a thin film of a synthetic resin is applied onto one side of the paper product is also proposed as a means for reinforcing paper. However, the products obtained according to such method are hard and inferior in touch or appearance and have poor water-resistance. When the paper products are treated with a dilute solution of the graft copolymer of this invention, they can be rendered water-resistant without damaging the characteristic appearance or feeling of such paper products. Other conventional methods for reinforcement of paper products include impregnation of the products with a thermosetting resin or urethanized polyvinyl alcohol. However, reinforcement by such method necessitates a curing treatment after drying. In case a dilute solution of the graft copolymer is used for reinforcing agent, the paper products coated with a water-resistant film can be obtained simply by drying the treated materials at room temperature. Thus, the reinforcing methods can significantly be simplified by the use of the graft copolymer of this invention.

The graft copolymer of this invention can be used for treating glass and various large merits can be obtained thereby. If glass products treated with the graft copolymer is broken, the broken pieces of glass will not scatter and safety is warranted because of strong binding power of the graft copolymer acting to bond such broken pieces. This effect is particularly advantageous in the case of applying the graft copolymer to bottles which may burst by high internal pressure, such as those for beer, carbonate-pressured drinks, etc. It is also of practical advantage if the graft copolymer is applied to window glass.

As the graft copolymer of this invention is excellent in transparency and appearance and harmless to human body, it can be used for ceramics or glass dinnerware or any other kinds of utensils commonly used in daily lift. In addition, the graft copolymer is excellent in weather-resistance, heat-resistance and cold-resistance, and so may be applied to glass for greenhouse and other wide variety of purposes. If glass plate is provided with a masking with letters or designs cut out and sprayed with the paint, decorative articles, billboards or other kinds of articles with fine designs can be manufactured. As the graft copolymer of this invention possesses a strong binding effect, it may be used for laminating several sheet of glass to manufacture sandwich glass of good quality. It is also possible to use the graft copolymer for repairing broken glass-wares.

The graft copolymer of this invention can be applied to fibrous materials. The prior arts for rendering fibrous materials water-proof include the use of a water-soluble or water-dispersible resin by impregnation or spray coating and the use of a resin dissolved in organic solvents for the same means of application. In the latter case, a wax such as paraffin and carnauba wax, and hydrophobic polymers such as polyethylene, polyamide, polybutene, polyvinyl acetate and styrene/butadiene copolymer are used as treating agent. However, the water-proof fibrous materials obtained by these known treatments is generally inferior in durability and has a demerit that the resins comes off from the coated material or forms cracks by repeated friction or bending or external force, thus resulting in gradual decrease in water-proof property. This is because the polymer itself does not have enough flexibility and cannot be elongated in compliance with bending or folding and because the polymer has poor adhesiveness to fiber. When cloth is impregnated with a dilute solution of the graft copolymer of this invention and then dried, water-proof cloth with good durability can be produced without damaging the appearance and feeling of the cloth. If a coarse cloth such as "Kanreisha" fabric (a sort of gauze) is impregnated with a relatively concentrated solution of the graft copolymer of this invention and then dried, a transparent, fiber-reinforced polymeric sheet which permits the passage of sunlight through all the texture filled with the graft copolymer is obtained.

The graft copolymer can be dispersed in a usual manner into water to form an emulsion which in turn can be used for the production of impregnated articles or as paints, coating agents, adhesives or sealing agents. The graft copolymer of this invention can also be used as a polymer-modifying agent by mixing it with natural and synthetic rubbers or various resins to improve their physical and chemical properties. For example, it is possible to decrease eliminate of fluidity of natural or synthetic rubbers to increase their green strength at room temperature by incorporating them with the graft copolymer of this invention. Further, impact-resistance of various resins such as poly(methyl methacrylate, polyvinyl chloride, polystyrene and styrene/acrylonitrile copolymer can be enhanced by incorporating them with the graft copolymer of this invention.

As has been stated, the graft copolymer of this invention can be used alone for various purposes or in combination with various materials to improve their properties. Thus, the fields to which the graft copolymer of this invention can be applied are exceptionally wide and no other substance has such a wide utility.

This invention will be illustrated in more detail by way of examples wherein parts and percentages are by weight unless otherwise specifically indicated.

EXAMPLE 1

Into a reactor equipped with a stirrer, a condenser and an inlet for nitrogen were charged 870 parts of toluene, 60 parts of ethylene/propylene/ethylldenenorbornene terpolymer ("Espren 502" manufactured by Sumitomo Kagaku; iodine value 12), 60 parts methyl methacrylate and 1.5 parts benzoyl peroxide. The mixture was, stirred to form a homogeneous solution.

After replacing air in the system by nitrogen, the mixture was allowed to polymerize at 85°C for 8 hours. After completion of the polymerization, the whole mixture was poured into excess methanol to precipitate the polymer which was then extracted with acetone under reflux to remove homopolymer whereby 71.9 parts of the graft copolymer were obtained.

An IR-absorption spectrometry of this product showed that absorption bands were observed at the neighborhood of 1725, 1240, and 1150, cm$^{-1}$ which are the characteristic absorption bands of methyl methacrylate and ethylene/propylene/non-conjugated diene terpolymer. It was confirmed therefore that methyl methacrylate was obviously grafted to the terpolymer.

A dumbbell was molded from this graft copolymer and its physical properties were measured according to JISK 6301.

As a result of the measurement, tensile strength was found to be 113 kg/cm$^2$, elongation 700 %, 300% modulus 25 kg/cm$^2$ and permanent elongation 20 %. The test piece could again be dissolved in toluene after measurements.

EXAMPLE 2

Into a reactor were charged 870 parts of toluene, 20 parts of ethylene/propylene/ethylidenenorbornene terpolymer ("Esprene 505" manufactured by Sumitomo Kagaku; iodine value 24), 60 parts of methyl methacrylate and 3.4 parts of benzoyl peroxide. The mixture was made up to a homogeneous solution. After polymerization at 80°C for 5 hours, the reaction mixture was poured into excess methanol to obtain 33.9 parts of the graft copolymer containing the homopolymer. A part of the graft copolymer thus obtained was extracted with aceton under reflux to remove the homopolymer, and physical properties of the product were measured. The results are shown in Table 1 below.

Table 1

| | Tensile strength (kg/cm$^2$) | Elongation (%) | 300 % Modulus (kg/cm$^2$) | Permanent elongation (%) | Whitening on stretching |
|---|---|---|---|---|---|
| Before extraction | 200 | 530 | 119 | 48 | Whitened considerably |
| After | 224 | 700 | 29 | 17 | none |

Table 1-continued

| | Tensile strength (kg/cm$^2$) | Elongation (%) | 300 % Modulus (kg/cm$^2$) | Permanent elongation (%) | Whitening on stretching |
|---|---|---|---|---|---|
| extraction | | | | | |

It is evident from the table that in order to use the graft copolymer as a rubber requiring no vulcanization, the extraction treatment is very effective, and that the physical properties of the graft copolymer are as good as or even better than the known vulcanized natural or synthetic rubber. Various characteristics of the graft copolymer (after extraction) prepared according to Example 2 are shown in Table 2 in comparison with those of a similar graft copolymer, i.e. natural rubber/methyl methacrylate graft copolymer and those of styrene/butadiene block copolymer which is a rubber with similar properties requiring no vulcanization.

EXAMPLE 4

A graft polymerization was carried out similarly as described in Example 2 except that the reaction time was 3 hours instead of 5 hours and that 1.5 parts of ferric acetylacetonate were added. By refluxing the product with acetone, 28.4 parts of a graft copolymer free from a homopolymer were obtained.

The physical properties of the graft copolymer thus obtained were as follows: tensile strength 168 kg/cm$^2$, elongation 700 %, 300 % modulus 32 kg/cm$^2$ and permanent elongation 19 %. These values are almost equal Table 2

| | | | Graft copolymer obtained in Example 2 | Known natural rubber/ methyl methacrylate graft copolymer | Known styrene/ butadiene block copolymer |
|---|---|---|---|---|---|
| Physical properties JIS K-6301 | | Tensile strength (kg/cm$^2$) | 224 | 192 | 115 |
| | | Elongation (%) | 700 | 430 | 1100 |
| | | 300% Modulas (kg/cm$^2$) | 29 | 107 | 20 |
| | | Permanent elongation (%) | 17 | 120 | 20 |
| Thermo- ageing resistance | 70°C × 72 hrs. | Tensile strength (kg/cm$^2$) | 192 | 160 | 203 |
| | | Elongation (%) | 750 | 540 | 790 |
| | | 300% Modulas (kg/cm$^2$) | 29 | 52 | 57 |
| | 100°C × 72 hrs. | Tensile strength (kg/cm$^2$) | 184 | almost nil | molten |
| | | Elongation (%) | 740 | 200 | |
| | | 300% Modulas (kg/cm$^2$) | 26 | — | |
| Stress relaxation [1] | | 50°C | 71 | 36 | |
| | | 80°C | 52 | 26 | molten |
| | | 100°C | 38 | 14 | |
| Weather-resistance [2] | | Tensile strength (kg/cm$^2$) | 200 | almost nil | almost nil |
| | | Elongation (%) | 360 | " | " |
| | | 300% Modulas (kg/cm$^2$) | 122 | — | — |
| Ozone-resistance [3] | | (hours) | 480 | 15 | 3 |
| Transparency [4] | | (%) | 89 | 76 | 86 |

[1] Residual stress after 100 minutes at 100% elongation/Initial stress × 100
[2] Exposed to Sunshine weatherometer for 24 hours.
[3] Time required until the sample breaks in an atmosphere containing 50 pphm ozone at 50% elongation
[4] Light transmission against air of a sample (0.2 mm in thickness) measured at 580 mμ.

The graft copolymer obtained in Example 2 was found to be excellent in heat-resistance, weather-resistance and ozone-resistance, as compared with the known graft copolymer and block copolymer shown in Table 2.

EXAMPLE 3

A graft polymerization was carried out in the same manner as described in Example 2. After completion of the polymerization reaction, the polymerization mixture in toluene was poured into acetone at room temperature to remove homopolymer whereby 26.3 parts of the graft copolymer were obtained. The physical properties of the resulting graft copolymer were found as follows: tensile strength 217 kg/cm$^2$, elongation 750 %, 300 % modulus 29 kg/cm$^2$, and permanent elongation 21 %. It was a graft copolymer which did not exhibit whitening on stretching and possessed similar properties to those in the case of extraction with acetone under reflux.

to those determined for the graft copolymer obtained in Example 2 after extraction. It is evident that the addition of ferric acetylacetonate serves to activate the radical polymerization initiator, resulting in promotion of the graft polymerization reaction.

The graft copolymer thus obtained was dissolved in toluene and chloroform to have a concentration of 4 %. A glass test tube having an internal diameter of 10 mm was immersed in this solution and dried. After evaporation of the solvent, the test tube was removed whereby a strong, well stretching, hollow object with a thin wall was obtained which was transparent in the case of toluene and opaque as if it were frosted in the case of chloroform.

Because the product excels in heat-resistance, weather-resistance and ozone-resistance, it is particularly useful for such medical articles as gloves for operation and finger sacs and hygienic articles such as ice bags, sanitary sacs and nipples. This product can also be used preferably as a lining agent to protect the applied articles from damages due to corrosion or defacement.

EXAMPLE 5

61.3 parts of the graft copolymer free from any homopolymer was obtained by carrying out the polymerization in the same manner as described in Example 2 except that 1470 parts of trichloroethylene and 50 parts of Esprene 502 were added and that the polymerization time was 7 hours, and thereafter refluxing the product with acetone.

The physical properties of the graft copolymer thus obtained were as follows: tensile strength 135 kg/cm$^2$, elongation 730 %, and 300 % modulus 22 kg/cm$^2$.

When this graft copolymer was dissolved in trichloroethylene at a concentration of 5 % and was applied onto an article of black-filled styrene/butadiene rubber, the article became glossily black and an article far beyond the general image of black rubber was obtained.

This article was elongated by 20 % and was allowed to stand in an atmosphere containing 50 pphm ozone for 6 days. While the untreated article formed many ozone cracks, the painted article exhibited no abnormity, thus showing the excellent ozone crack-preventing effect of the copolymer.

EXAMPLE 6

A polymerization reaction was carried out in the same manner as described in Example 2 except that 783 parts of toluene, 79 parts of isopropyl alcohol as a viscosity-adjusting agent, 100 parts of Espren 505 and 3 parts of benzoyl peroxide were used. After refluxing the product with acetone, 118.2 parts of a graft copolymer were obtained.

The physical properties of the graft copolymer thus obtained were as follows: tensile strength 124 kg/cm$^2$ elongation 780 %, 300 % modulus 20 kg/cm$^2$ and permanent elongation 26 %.

EXAMPLE 7

199.5 Parts of a graft copolymer containing a homopolymer were obtained in the same manner as described in Example 2 except that 240 parts of methyl methacrylate were used.

The obtained graft copolymer was a hard, transparent and tough resinous polymer and its tensile strength and elongation was 372 kg/cm$^2$ and 11 %, respectively.

Transparent ABS resin can be mentioned as a known transparent, hard, impact-resistant resin but it involves a problem in weather-resistance. On the other hand, impact-resistant resins with good weather-resistance containing chlorinated polyethylene or a derivative of polyacrylic esters as rubber component have a disadvantage in that they are opaque. A resin with all of the desired characteristics including good transparency, weather-resistance and impact-resistance, has long been demanded in the art. The product obtained in this example is a copolymer which fully satisfies all the conditions regarding these characteristics.

EXAMPLE 8

120.1 Parts of a graft copolymer were obtained by carrying out the grafting reaction in the same manner as described in Example 1 except that 100 parts of Esprene 505 were used and the reaction time was 6 hours.

The physical properties of the obtained graft copolymer were as follows: tensile strength 144 kg/cm$^2$, elongation 950 %, 300 % modulus 15 kg/cm$^2$, and permanent elongation 42 %. When this graft copolymer was dissolved in benzene at a concentration of 20 %, and was used to seal openings in house such as those in sliding partitions, paper sliding screens and walls, it could completely prevent intrusion of draft or dust. When the sealing is not needed any more after use, it could easily be peeled off without any influence to the applied objects.

The aforementioned graft copolymer is also useful as a sealing agent, a coking agent or a sealant for which thermoageing-resistance, weather-resistance and ozone-resistance are particularly required.

EXAMPLE 9

A polymerization reaction was carried out in the same manner as described in Example 2 except that 783 parts of toluene, 81 parts of methyl ethyl ketone, 100 parts of Esprene 505 80 parts of methyl methacrylate and 3 parts of benzoyl peroxide were used. After refluxing the product with acetone, 124 parts of a graft copolymer were obtained.

The physical properties of the obtained graft copolymer were as follows: tensile strength 110 kg/cm$^2$, elongation 720 %, 300 % modulus 26 kg/cm$^2$ and permanent elongation 22 %.

EXAMPLE 10

A polymerization reaction was carried out in the same manner as described in Example 2 except that 880 parts of benzene and 50 parts of Esprene 505 were used and the reaction time was 8 hours. After completion of the polymerization, the polymerization mixture was extruded into acetone at room temperature through a nozzle with a small opening and the resulting fiber was collected by rolling while removing a homopolymer simultaneously.

Thread formed after evaporation of the solvent was a transparent, tough elastic fiber with good stretchability. The physical properties of this graft copolymer were as follows: tensile strength 238 kg/cm$^2$, elongation 560 % and 300 % modulus 89 kg/cm$^2$. Thus, the fiber possessed desirable properties for elastic fiber.

The obtained fiber is suitable for rubbery thread with good weather-resistance for socks or foundations. As the fiber is a colorless, transparent copolymer, it can be colored freely.

100 parts of the aforementioned graft copolymer was dissolved in chloroform at a concentration of 12 %. A commercially available nylon cloth was coated with the copolymer by dipping the cloth in this solution and drying.

The fibrous article thus obtained was a weather-resistant, tough and slightly stretchable sheet with all the mesh openings of the cloth being clogged with the copolymer and was suitable for manufacturing various products which can take advantage of the characteristics of this material, such as rubber-made tank, fabric products containing air (tire, air bag etc.), air spring products, cloth for umbrellas, and rain coats, and covers of baby's napkin.

EXAMPLE 11

A polymerization reaction was carried out in the same manner as described in Example 2 except that 200 parts of Esprene 505, 200 parts of methyl methacrylate and 7 parts of benzoyl peroxide were used. After refluxing the product with acetone, 323.7 parts of a graft copolymer were obtained.

The physical properties of the obtained graft copolymer were as follows: tensile strength 162 kg/cm², elongation 540 %, 300 % modulus 82 kg/cm² and permanent elongation 27 %.

100 parts of this graft copolymer were dissolved in toluene at a concentration of 5 %. To this solution were added 1.5 parts of tetramethyl thiuram disulfide and 2 parts of benzoyl peroxide and the mixture was made up to a homogeneous solution. When this solution was applied onto an article of natural rubber and was heated at 120°C for 20 minutes, a solvent-resistant film was formed on the surface of the article.

When this article was placed in an atmosphere containing 50 pphm ozone for 144 hours, degradation of the natural rubber was hardly observed, indicating the extremely high quality of the graft copolymer as a surface-treating agent for rubber possessing good weather-resistance.

EXAMPLE 12

A polymerization reaction was carried out in the same manner as described in Example 2 except that various kinds of ethylene/propylene/non-conjugated diene terpolymer were used. The physical properties of the graft copolymer obtained after refluxing the product with acetone were measured. The result of the measurements are shown in Table 3.

terpolymer ("Mitsui EPT 4045" produced by Mitsui Sekiyu Kagaku; iodine value 24; Mooney viscosity $ML^{1+4}$ 100°C, 40), 160 parts of methyl methacrylate and 6.4 parts of benzoyl peroxide. The reactants were mixed to form a homogeneous solution. Air in the reaction system was replaced with nitrogen and the mixture was reacted at 90°C for 8 hours to complete the polymerization whereupon a viscous transparent solution was obtained.

This solution was spread to form a sheet and its physical properties were determined. As the result of measurements, this sheet with a lusterous surface was found to have a tensile strength of 136 kg/cm² and an elongation of 200 %. This solution can suitably be used as a lacquer-type paint having excellent weather-resistance and impact-resistance.

EXAMPLE 14

Using a monomer selected from ones given in Table 4 as an ethylenically unsaturated monomer copolymerizable with methyl methacrylate, a polymerization reaction was carried out in a manner similar to that described in Example 13 to obtain the resuls as shown in Table 4 wherein the numerals stand for the amount used (parts by weight).

Table 4

| Ingredients | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|
| Toluene | 870 | 870 | 870 | 870 | 870 | 870 | 870 | 870 | 870 | 870 | 870 | 870 | 870 | 870 | 870 | 870 |
| EPT "4045" * (Mitsui) | 80 | 80 | 80 | 80 | 80 | 80 | 80 | 80 | 80 | 80 | 80 | 80 | 80 | 80 | 80 | 80 |
| Methyl methacrylate | 160 | 160 | 160 | 160 | 160 | 160 | 160 | 160 | 160 | 160 | 160 | 160 | 160 | 160 | 160 | 160 |
| Benzoyl peroxide | 6.4 | 6.4 | 6.4 | 6.4 | 6.4 | 6.4 | 6.4 | 6.4 | 6.4 | 6.4 | 6.4 | 6.4 | 6.4 | 6.4 | 6.4 | 6.4 |
| 2-Hydroxypropyl methacrylate | 4 | 8 | | | | | | | | | | | | | | |
| N-Methylolacrylamide | | | 4 | 8 | | | | | | | | | | | | |
| Acrylic acid | | | | | 4 | 8 | | | | | | | | | | |
| Acrylamide | | | | | | | 4 | 8 | | | | | | | | |
| Glycidyl methacrylate | | | | | | | | | 4 | 8 | | | | | | |
| Maleic anhydride | | | | | | | | | | | 4 | 8 | | | | |
| Styrene | | | | | | | | | | | | | 4 | 8 | | |
| Acylonitrile | | | | | | | | | | | | | | | 4 | 8 |
| Conditions and Properties | | | | | | | | | | | | | | | | |
| Polymerization (°C) temperature | 90 | 90 | 90 | 90 | 90 | 90 | 90 | 90 | 90 | 90 | 90 | 90 | 90 | 90 | 90 | 90 |
| Polymerization time (Hr) | 8 | 8 | 8 | 8 | 8 | 8 | 8 | 8 | 8 | 8 | 8 | 8 | 8 | 8 | 8 | 8 |
| Tensile strength (kg/cm²) | 121 | 105 | 121 | 100 | 141 | 98 | 124 | 119 | 122 | 122 | 137 | 79 | 136 | 130 | 142 | 48 |
| Elongation (%) | 200 | 200 | 190 | 230 | 180 | 190 | 220 | 250 | 190 | 210 | 200 | 150 | 210 | 200 | 130 | 180 |

*EPT "4045" (Mitsui): an ethylene/propylene/non-conjugated diene terpolymer marketed under the trade name of "EPT 4045" from Mitsui Sekiyu Kagaku K.K.

The graft copolymers obtained in Examples 14–25 and Examples 28–29 contain as their graft moiety a Table 3

| Ethylene/propylene non-conjugated terpolymer | | Non-conjugated diene | Iodine value | Mooney viscosity $ML^{1+4}$ (100°C) | Grafting*² rate (%) | Tensile strength (kg/cm²) | Elongation (%) | 300% Modulas (kg/cm²) |
|---|---|---|---|---|---|---|---|---|
| Esprene | 301 | Dicyclopentadiene | 10 | 60 | 5.5 | 30 | 1260 | 7 |
| " | 301A | " | 10 | 40 | 5.9 | 29 | 1300 | 7 |
| " | 501 | 5-ethylidene-2-norbornene | 12 | 55 | 9.4 | 101 | 890 | 13 |
| " | 501A | " | 12 | 40 | 15.5 | 132 | 870 | 18 |
| " | 502 | " | 12 | 90 | 11.4 | 157 | 820 | 17 |
| " | 505*¹ | " | 24 | 75 | 31.7 | 224 | 700 | 29 |
| " | 505A | " | 24 | 40 | 29.0 | 199 | 600 | 57 |

*¹Same as in Example 2.

*²Grafting rate = $\dfrac{\text{weight of methyl methacrylate grafted}}{\text{weight of ethylene/propylene/non-conjugated diene terpolymer}} \times 100$

EXAMPLE 13

In a reactor were placed 870 parts of toluene, 80 parts of ethylene/propylene/ethylidene-norbornene monomer having a large polarity and so their adhesiveness is especially remarkable to metal, wood, glass and certain kinds of rubbers and plastics. Accordingly, these graft copolymers are suited as adhesive or paint vehicle. In addition, these graft copolymers are moderately hygroscopic and advantageously utilizable in the fields where hygroscopic action is required. The graft copolymers obtained in Examples 26–29 contain as their graft moiety a hard resin-forming monomer and so have good lustrous surface and toughness, with those obtained in Examples 28 and 29 being particularly remarkable also in oil-resisting property. Enamel-type paints possessing excellent weather-resisting, oil-resisting and impact-resisting properties can be manufactured by incorporating a melamine resin for paint use into the graft copolymers obtained in Examples 14–19 and 22–25, a compound having two or more of epoxy groups into the graft copolymers obtained in Examples 14–21, and a compound having two or more of isocyanate groups into the graft copolymers obtained in Examples 14–17.

EXAMPLE 30

A graft polymerization was carried out at 90°C for 5 hours in a manner similar to that described in the foregoing Examples, using 870 parts of toluene, 80 parts of Esprene 505 (ethylene/propylene/non-conjugated terpolymer marketed by Sumitomo Kagaku), 50 parts of methyl methacrylate and 2.1 parts of benzoyl peroxide, and 91.6 parts of a graft copolymer having a tensile strength of 138 kg/cm$^2$, an elongation of 780 %, a 300 % modulas of 21 kg/cm$^2$ and a permanent elongation of 19 % were obtained after extraction.

A paint was prepared by dissolving 40 parts of the graft copolymer obtained as stated above in 960 parts toluene, and adding to the resulting solution 5 parts of fine powder paste of aluminum "Alpaste 46-086" manufactured by Toyo Aluminum) and one part of coloring agent ("Spiron Red GEH Special" manufactured by Hodogaya Kagaku). This paint was applied onto door weather strip sponge products of car doors made of chloroprene rubber.

As the result, adhesion between the sponge rubber and this paint was exceedingly good partly because of the anchoring effect of this paint penetrating into small pores on the surface of the sponge rubber. No abnormity was observed after cross cut tests in which cuts were made at an interval of every millimeter in both vertical and horizontal directions with a sharp knife and then the paint film was peeled off by an adhesive tape and after one hundred thousand times of a bending test for evaluating flexibility. By preparing the coloring agent in conformity with the body color of the car, the door weather strip can be painted in the same color as the car body, in contrast to the case of conventional door weather strips where the color was often dissonant to the body color. Therefore, products with good design can be provided by the paint of this invention.

EXAMPLE 31

A graft polymerization was carried out at 85°C for 6 hours in a manner similar to that described in the foregoing Examples, using 870 parts of toluene, 100 parts of Esprene 505, 60 parts of methyl methacrylate and 1.5 parts of benzoyl peroxide, and 120.1 parts of a graft copolymer having a tensile strength of 144 kg/cm$^2$, an elongation of 950 %, a 300 % modulas of 15 kg/cm$^2$ and a permanent elongation of 42 % were obtained after extraction.

A clear paint was prepared by dissolving 50 parts of the graft copolymer in 950 parts of toluene. This paint was applied onto a cleaned surface of black, vulcanized rubber sheet of ethylene/propylene/non-conjugated diene terpolymer and then dried at room temperature. This paint film firmly adhered to the rubber surface. Since no abnormity was observed after the cross cut tests and after one hundred thousand times of a bending test for evaluating flexibility the paint was found to withstand the dynamic use. Painting a vulcanized ethylene/propylene/non-conjugated diene terpolymer with good adhesion was very difficult according to the prior art methods, but can be readily achieved without any treatment with a primer by using the paint of this invention.

EXAMPLE 32

A paint was prepared by dissolving 40 parts of the graft copolymer obtained in Example 31 in 960 parts of toluene and dispersing thereinto 5 parts of a fine powder paste of aluminum ("Alpaste 1200 N").

This paint was applied onto a pressed sheet of carbon-filled natural rubber of a thickness of 2 mm after cleaning the surface. The natural rubber sheets with the paint film of a varied thickness were placed for 70 hours in a constant temperature box kept at 120°C and then the physical characteristics were measured. The results of the measurements are shown in Table 5. By applying this paint, heat-resistance of the rubber was greatly improved.

Table 5

| Characteristics | | Vulcanized natural rubber sheet with a hardness H,45 | | Vulcanized natural rubber sheet with a hardness H,55 | |
|---|---|---|---|---|---|
| | | Tensile strength | Break-down elongation | Tensile strength | Break-down elongation |
| Characteristics before heat-resistance test | | 269 kg/cm$^2$ | 620% | 241 kg/cm$^2$ | 450% |
| Characteristics After heat-resistance tests at 120°C for 70 hours | unpainted material | | | 105 | 250 |
| | Material painted to a thickness of | | | | |
| | 0.1 mm | | | 137 | 290 |
| | 0.02 mm | 22 | | 140 | 310 |
| | 0.04 mm | 29 | | 149 | 320 |
| | 0.07 mm | | | 155 | 300 |

EXAMPLE 33

A graft polymerization was carried out at 80°C for 5 hours in a manner similar to that described in the foregoing example, using 870 parts of toluene, 200 parts of Esprene 505, 200 parts of methyl methacrylate and 7.0 parts of benzoyl peroxide, to obtain 323.7 parts of a graft copolymer including homopolymer of methyl methacrylate and having a tensile strength of 162 kg/cm$^2$, an elongation of 540 %, a 300 % modulas of 82 kg/cm$^2$ and a permanent elongation of 27 %.

A paint was prepared by dissolving 80 parts of the graft copolymer obtained as stated above in 920 parts of toluene and adding to the resulting solution 20 parts of calcium carbonate and 35 parts of red iron oxide. The paint was applied onto a steel panel surface of which had been polished with a No. 200 emery paper. When the panel was subjected to a brine (5% × 35°C) spraying test, unpainted panel became rusty within 48 hours, but the painted one did not show any rust or any peeling-off of the paint film, thus proving the strong rust-protective function. When the painted steel panel was bent at an angle of 180° and then straightened to the original state, any crack, crevice or peeling-off was never observed. Accordingly, the paint was found to be excellent in compliance and adhesivity to the base.

EXAMPLE 34

This example shows the use of the graft copolymer of this invention for improving thermoresistance of a mounting rubber made of natural rubber. Since exhaust gas of cars is re-burned recently with a view to minimizing environmental pollution caused thereby, the inside temperature of engine rooms is elevated. Conventional mounting rubbers made of natural rubber had limited durability because of their poor heat-resistance. In this example, a coating composition comprising the graft copolymer of this invention is applied mounting rubbers made of natural rubber in order to protect them from radiant heat.

First of all, a graft polymerization was carried out at 80°C for 8 hours in a manner similar to that described in the foregoing examples, using 880 parts of benzene, 50 parts of Espren 505, 60 parts of methyl methacrylate and 3.4 parts of benzoyl peroxide, and 70.2 parts of a graft copolymer having a tensile strength of 238 kg/cm$^2$, an elongation of 560 %, a 300 % modulas of 89 kg/cm$^2$ and a permanent elongation of 12 % were obtained after extraction.

A paint was prepared by dissolving 50 parts of the graft copolymer obtained as stated above in 950 parts of trichloroethylene, and adding to the resulting solution 5 parts of a fine powder paste of aluminum (Alpaste 46-086). This paint was then applied onto a cleaned surface of a mounting rubber made of natural rubber and heated at 120°C for 20 minutes. As the result, no abnormity was found in the cross cut test and good adhesion was observed. The mounting rubber was located at a distance of 56 cm from four 250 W infrared lamps. While blowing with an electric fan, elevation of the temperature on the surface and inside of the rubber was checked. It was then found that elevation of the temperature on the surface of the coated rubber was about 35°C lower than the temperature of uncoated rubber. Thus, the paint of this invention can protect the rubber against radiant heat and improves heat-resistance of the mounting rubber made of natural rubber.

EXAMPLE 35

A baking paint was prepared by dissolving 50 parts of the graft copolymer obtained in example 34 to 950 parts of trichloroethylene and adding to the resulting solution 5 parts of a fine powder paste of aluminum (Alpaste 46-086), 25 parts of a coloring agent ("Spiron Yellow GRH special") and 1.5 parts of dicumyl peroxide.

This paint was applied onto a window frame rubber for cars made of styrene-butadiene rubber, dried at room temperature and then hardened by baking the coating at 160°C for 20 minutes. As the result, a paint film which adhered strongly to the rubber without showing abnormity in the cross cut test was obtained. Further, this coated product was elongated by 20% and allowed to stand in an atmosphere containing 50 pphm ozone for 144 hours and thereafter its surface was examined. Although uncoated products (control) showed many cracks produced by ozone, the coated ones showed no abnormity, thus indicating the remarkable effect in preventing cracks produced by ozone. When the coated surface was wiped with gasoline, the paint did not dissolve therein and a paint film was proved to be excellent in solvent-resistance, weather-resistance, ozone-resistance and thermo-ageing-resistance. Conventional rubbers for window frames were black in color and were not desirable in the aspect of design. However, metallic golden color could be obtained by the use of the paint of this example, and other metallic colors in harmony with the body colors of cars can be obtained by proper selection of the coloring agents. thus attaining favorable designing effects.

EXAMPLE 36

A graft copolymerization was carried out in the same manner as described in Example 33 except that the reaction time was 6 hours, to obtain a toluene solution of a graft copolymer for coating use. This graft copolymer had a tensile strength of 213 kg/cm$^2$, an elongation of 330 % and a 300 % modulas of 199 kg/cm$^2$ and has a tough, hard solid showing no sign of whitening at the time of stretching notwithstanding a homopolymer contaminant was not eliminated by extraction.

Further toluene was added to the aforementioned toluene solution until the polymer concentration became 40g/liter to prepare a coating solution for forming a clear film.

Using an ABS resin, a test piece of JIS No. 3 dumbbell for determination of tensile strength was molded by injection molding.

The test piece was coated with the solution by immersion to form a film of 20 $\mu$ in thickness on the surface of the test piece. Both coated and uncoated test pieces were deteriorated in a sunshine weatherometer for a given period of time and then weather-resistance of both pieces was compared by measurement of the change in break-down elongation. The results are shown in Table 6 wherein data for a commercially available paint for ABS resins is also given for comparison.

EXAMPLE 37

To 1 liter of the solution prepared in Example 36 were added 50g of fine powders of aluminum ("Alpaste High Sparkle"), and the mixture was stirred and made up into a homogeneous solution for forming a metallic silver film.

Test pieces for determination of tensile strength were molded from an ABS resin and a metallic silver film of about 20 $\mu$ in thickness was made in the same way as described in Example 36. The results of tests made on the coated test pieces are shown in Table 6.

EXAMPLE 38

To 1 liter of the solution prepared in Example 36 were added 10 g of fine powders of aluminum (Alpaste High Sparkle) and 1.6 g of a yellow coloring agent ("Bali Fast Yellow" manufactured by Orient Kagaku)

to prepare a homogeneous solution for forming a metallic yellow film.

As described in Example 36, test pieces of an ABS resin were immersed in this solution to form a metallic yellow film of about 20 μ in thickness on the surface of the test pieces. Similar tests were performed with these test pieces, results of which are shown in Table 6.

Table 6

| Test time | Measurement of the change in break-down elongation | | | | |
|---|---|---|---|---|---|
| | Uncoated material (control) | Example 1 | Example 2 | Example 3 | A commercially available paint for ABS |
| 0 hours | 40.1 % | — | — | — | — |
| 60 | 9.3 | 16.3 | 29.8 | 24.0 | — |
| 120 | 9.7 | 12.0 | 22.4 | 15.8 | 11.6 |
| 160 | 7.6 | 11.5 | 19.9 | 15.0 | — |
| 200 | 7.6 | 10.1 | 20.3 | 14.1 | 11.8 |

From these results it is seen that, whereas break-down elongation of the uncoated pieces decreased to about one quarter of the original value after lapse of 60 hours and all of the test pieces exhibited brittle break, the values of break-down elongation of painted pieces obtained in Example 36, 37 and 38 were higher than those of the uncoated pieces and that weather-resistance was greatly improved in the coated test pieces. As the surface of the ABS resin test pieces is moderately attacked by toluene (solvent of the solution for forming a film), the film adhered to the surface of the resin firmly and did not come off after deterioration.

EXAMPLE 39

A graft polymerization was carried out at 80°C for 5 hours in a manner similar to that described in the foregoing examples, using 870 parts of toluene, 80 parts of Esprene 505, 90 parts of methyl methacrylate and 4.5 parts of benzoyl peroxide, and a graft copolymer having a tensile stength of 180 kg/cm$^2$, an elongation of 570%, a 300% modulus of 70 kg/cm$^2$ and a permanent elongation of 16% were obtained after extraction.

The resulting graft copolymer free from a homopolymer was dissolved in chloroform to prepare a solution having a copolymer concentration of 10%. A Kanreisa fabric having thread number of 11 × 12 (No. 30 Vinylon thread) was dipped into this solution and was dried at room temperature. As the result, interstices in the fabric were completely filled with the above-mentioned graft copolymer, and a water-proof sheet comprising the fabric substrate of 0.3 mm in thickness with transparent spaces between threads was obtained.

Using this sheet comprising the fabric substrate, various tests were performed according to JIS K-6732 (standard for polyvinyl chloride sheets for agricultural purposes). The results of tests are tabulated below.

Table 7

| | Standard class 1 (0.2mm in thickness) | Example 39 | Example 40 |
|---|---|---|---|
| Load required for tensile break (kg) [1] | above 3.0 | 5.5 | 6.3 |
| Break-down elongation (%) [1] | above 230 | 10 | 10 |
| Load required for [2] right-angled tear (kg) | above 0.75 | 2.2 | 2.2 |
| Water-extractable amount (%) [3] | below 0.5 | 0.34 | 0.25 |
| Loss in weight on heating (%) [4] | below 5.0 | 0 | 0 |
| Degree of coloration after heating [5] | not colored more than light yellow | light yellow | light yellow |

[1] Load and elongation required until a sheet cut out in the shape of JIS No. 1 dumbbell broke when it was pulled at a rate of 200 mm/min.

[2] Load required to tear when a sheet cut out in the shape of JIS B type dumbbell was pulled at a rate of 200 mm/min.

[3] Amount extracted with water when the sample has been immersed in distilled water at 50°C for 24 hours.

$$\frac{\text{initial weight} - \text{weight after immersion}}{\text{initial weight}} \times 100$$

[4] Loss in weight on heating when the sample was hung in a heater at 100°C for 6 hours.

$$\frac{\text{initial weight} - \text{weight after heating}}{\text{initial weight}} \times 100$$

[5] Degree of coloration when a sheet was placed between two glass plates to prevent effects of air and was placed in a heater at 150°C for 2 hours.

The sheet satisfied the standards for polyvinyl chloride sheets for use in agricultural industry except break-down elongation.

In the above-mentioned tests, break-down elongation was measured at the time the fibers of the cloth break. (Elongation of the graft copolymer itself is above 500%.) Although the elongation of this sheet is small as shown in the table, such a large elongation is not required but rather moderate one is needed for sheets used to keep warmth for agricultural applications. Thus, the property of this sheet is desirable.

The sheet of 0.3 mm in thickness obtained in Example 39 weighs 44.6 g/m$^2$. For example, polyvinyl chloride sheets generally used for agricultural applications weight about 260g/m$^2$ with a thickness of 0.2 mm. It is readily understood that the sheets using the graft copolymer of this invention are very lightweight and are easy to handle in comparison with conventional products. Further, the sheets using the graft copolymer of this invention excel in weather-resistance, cold-resistance and warmth-keeping property and can be used widely in various fields where such excellent properties are required, for example, as tents, packaging materials and covers for motorboats or forklifts as well as warmth-keeping sheets in agricultural fields.

EXAMPLE 40

A graft polymerization was carried out at 90°C for 5 hours in a manner similar to that described in the foregoing examples, using 870 parts of toluene, 100 parts of Esprene 505, 100 parts of methyl methacrylate and 5.0 parts of benzoyl peroxide, and a graft copolymer having a tensile strength of 220 kg/cm$^2$, an elongation of 500%, a 300% modulus of 112 kg/cm$^2$ and a permanent elongation of 14% were obtained after extraction.

The resulting graft copolymer free from a homopolymer was dissolved in toluene to prepare a solution having a polymer concentration of 10%.

The same Kanreisa fabric as used in Example 39 was dipped into this solution and was dried at room temperature. As the result, a sheet comprising a fabric substrate having excellent properties as in the case of Example 39 was obtained. Properties of the obtained sheet were tested according to JIS K-6732, the results of which are shown also in the above table.

This sheet was, just like the one obtained in Example 39, a product useful for universal purposes where such excellent properties are desired, for example, in the field of agriculture.

EXAMPLE 41

In a reaction vessel equipped with a stirrer, a condenser and an inlet for introgen were placed 870 parts of toluene, 160 parts of Esprene 505, 160 parts of methyl methacrylate and 6.4 parts of benzoyl peroxide. The mixture was stirred to make a homogeneous solution.

Air in the system was replaced with nitrogen and a polymerization reaction was carried out at 80°C for 5 hours. After completion of the polymerization reaction, a viscous solution was obtained, which was then spread in a Petri dish. A film of 0.3 mm in thickness was prepared by evaporation of the solvent and physical properties of the copolymer in the form of a film was measured according to JIS K-6301.

Tensile strength of the copolymer was determined as 200 kg/cm$^2$, elongation as 370%, 300% modulus as 168 kg/cm$^2$ and permanent elongation as 47%. The product was a graft copolymer which was not whitened even if homopolymer is not extracted.

The aforementioned viscous solution obtained after completion of the polymerization was directly applied onto the edge of a slide glass of about 1mm in thickness which had been pretreated with γ-mercaptopropyltrimethoxy silane ("A-189" manufactured by UCC) and the slide glasses were bonded so as to face the applied edges with each other and dried at room temperature for about 60 minutes.

Transparency of the bonded portion was the same as the case of glass After bending at an angle of 360°, no detachment nor break was observed. After 30,000 times of bending at an angle of 90°, no abnormity could be observed in the bonded glass product. This composite product with excellent flexibility was useful as a hinge for glass.

EXAMPLE 42

To 100 parts of the graft copolymer obtained in Example 41 were added 20 parts of di-(2-ethylhexyl) sebacate. The mixture was made into a sheet of 1.5 mm in thickness. By the use of a plasticizer, di(2-ethylhexyl) sebacate, ductility of the sheet is improved.

Between two glass plates of 3 mm in thickness which had been pretreated with A-189 (the same primer as the one used in Example 41) the aforementioned sheet was sandwiched, heated under pressure and made up into a transparent glass laminate.

When this glass laminate was broken by hitting it with a steel ball, pieces of glass did not scatter and the glass was found to be bonded well to the intermediate layer.

As is shown in these examples, a binder using the graft copolymer of this invention provides on the other hand a glass a layer-laminate material. Hence, it is fully understood that the binder for glass using the graft copolymer of this invention is not construed as a mere binder for glass plates.

As is evident from above examples, utility of the binder for glass is very wide and can be used not only for manufacturing glass wares and for repairing broken glass wares but also as a material for processing various glass parts such as glass parts for interior decoration or as a material for bonding or laminating various glass material. Thus, usefulness of this invention is quite significant.

EXAMPLE 43

The graft copolymer obtained in Example 2 was dissolved in trichloroethylene to prepare a solution having a graft copolymer concentration of 2%. The solution was applied to beer bottles with contents which had been pretreated with γ-mercaptopropyltrimethoxysilane (A-189, U.C.C.) to obtain coatings of 70 μ, 130 μ and 260 μ in thickness.

The surface of the treated bottles somewhat lacked smoothness but, in general appearance, they could not be distinguished from untreated ones.

These treated bottles were exposed to direct sunlight for 30 minutes to raise the internal pressure of the bottles, dropped upon an iron plate from a height of 1.5 m, and the behavior upon rupture was examined by high-speed cinematography, the results of which are given in the table below.

Table 8

| | State of rupture and scattering of bottle fractures |
|---|---|
| Uncoated bottles | The bottles ruptured with a sound of explosion and all but bottle necks were scattered vigorously in small pieces. |
| Bottles coated with the copolymer of 70 μin thickness | The bottles were broken into large pieces upon rupture, but the pieces were not detailed from the coated film, and when bottle neck was lifted all the pieces followed. |
| Bottles coated with the copolymer of 130 μ in thickness | Same as above. |
| Bottles coated with the copolymer of 260 μ in thickness | A hole was made at the bottom of the bottle with a thick sound, but no small pieces scattered and only cracks formed. |

Observation of pictures obtained by high-speed cinematography indicated that the bottle neck swells once upon rupture and then contracts by the elasticity of the treated film. Hence the treated film was found to have an effect to prevent rupture in addition to that of preventing scattering.

EXAMPLE 44

40 Parts of the graft copolymer obtained in Example 2 were dissolved in 960 parts of toluene to prepare a solution having a concentration of 4 %, to which 15 parts of a yellow coloring agent "Spiron Yellow GRH" manufactured by Hodogaya Kagaku were then added, and the whole was made into a homogeneous solution. When this solution was applied on an external cylindrical surface and a bottom surface of a glass cup pretreated with γ-mercaptopropyltrimethoxysilane (A-189, U.C.C.), probability of slipping off the hand was reduced, although the surface lost smoothness slightly, the frictional resistance of the glass cup with kitchen desk having a melamine decorative plate on its surface became larger than that of untreated one (Maximum stationary frictional coefficients were 0.123 for untreated cups and 0.194 for treated ones). Thus, a risk of slipping down of glass cups from the table can be minimized by treating the glass cups with the graft copolymer. After immersion of the treated cup for 240 hours in an aqueous solution of a commercially available detergent for home use, no change could be seen.

The treated products could be colored brightly, thus bringing about great advantage from the aesthetic point of view. In addition, the treated products have a merit in handling; even if they are dropped and broken, glass pieces will not scatter at all.

EXAMPLE 45

The graft copolymer obtained in Example 11 was dissolved in toluene to prepare a solution having a concentration of 5 %. Staple fiber gauze of 1 m in width having 23 × 15 threads (No. 30 staple fiber thread) was dipped into this solution and dried at room temperature for 15 minutes. As the result, interstices in the texture were completely filled with the graft copolymer. Namely, the texture was fixed by this graft copolymer treatment, and a fabric sheet having good flexibility and transparent, light-transmissible property was obtained. When this fabric sheet was exposed to nature conditions by leaving it outdoor for one year, no ageing was observed. Since this fabric sheet excels in warmth-keeping property, it can be used in place of polyvinyl chloride sheets conventionally used in the fields of agriculture and horticulture.

The use of this fabric sheet brings about some other advantages. Firstly, the sheet weighs 49.8 g/m$^2$ and is lighter than the ordinary polyvinyl chloride sheets. Secondly, it does not crease when folded. Thirdly, tears do not spread and so the sheet is easy to handle.

EXAMPLE 46

The graft copolymer obtained in Example 11 was dissolved in toluene to prepare a solution having a concentration of 8 % and the resulting solution was used to treat corrugated cardboard. Surface-coated corrugated cardboard with excellent water-proof, property, moisture-resistance, water-repellence and reinforcing action was obtained, and the coating film had good compliance to the change in shape of the cardboard, even if it was deformed considerably. A carton made of the surface-treated corrugated cardboard is not slippery when piled up, such cardboard is convenient for transportation.

Further, adhesiveness between cardboard thus treated and a commercially available adhesive taper was much better than the case of using conventional wax-treated cardboard.

EXAMPLE 47

The graft copolymer obtained in Example 11 was dissolved in trichloroethylene to prepare a solution having a concentration of 10 %. A sheet of paper on which letters had been written was immersed in this solution and dried. On the surface of the paper obtained in this manner there was a lusterless, transparent film and the letters could not be erased with a rubber eraser or an ink eraser. The fiber-treating agent containing the graft copolymer of this invention is useful for treating important papers for preservation.

EXAMPLE 48

The graft copolymer obtained in Example 11 was dissolved in toluene to prepare a solution having a concentration of 8 %. A commercially available nylon cloth was dipped into this solution and dried. The nylon cloth thus obtained was tough, slightly stretchable, fiber-containing rubbery sheet product with excellent weather-resistance, water-proof property, moisture-resistance, water-repellence and reinforcing action having interstices entirely filled with the graft copolymer. The product may be used for various purposes for which its excellent properties are suited, for example, for the manufacture of fabric products using air such as tyres and air bags, air spring products, rubber tanks, cloth for umbrellas, raincoats and covers for baby's napkins.

EXAMPLES 49–53

Into a reaction vessel equipped with a stirrer, a condenser and an inlet for nitrogen were charged toluene, ethylene/propylene/non-conjugated diene terpolymer (Esprene 505 methyl methacrylate (referred to simply as MMA in the table) and benzoyl peroxide (referred to simply as BPO in the table) each in an amount shown in the table below. The mixture was stirred to form a homogeneous solution.

Air in the reaction system was replaced with nitrogen and the polymerization reaction was carried out at a given temperature for a given period of time. The resulting graft copolymer was tested according to the method of JIS K-6301 to determine physical properties of the graft copolymer without subjecting it to a treatment for eliminating a homopolymer by extraction. The results of test are shown in the Table below.

Table 9

| Example Nos. | 49 | 50 | 51 | 52 | 53 |
| --- | --- | --- | --- | --- | --- |
| Toluene (parts) | 870 | 870 | 870 | 870 | 870 |
| Esprene 505 (parts) | 120 | 140 | 160 | 180 | 200 |
| MMA (parts) | 120 | 140 | 160 | 180 | 200 |
| BPC (parts) | 4.8 | 5.6 | 6.4 | 7.2 | 8.0 |
| Polymerization temperature (°C) | 80 | 80 | 80 | 80 | 80 |

Table 9-continued

| Example Nos. | 49 | 50 | 51 | 52 | 53 |
|---|---|---|---|---|---|
| Polymerization time (Hrs.) | 5 | 5 | 5 | 5 | 5 |
| Concentration of Esprene 505 solution (g./liter) | 120 | 140 | 160 | 180 | 200 |
| MMA/Esprene 505 ratio | 1.0 | 1.0 | 1.0 | 1.0 | 1.0 |
| Tensile strength (kg/cm$^2$) | 180 | 185 | 202 | 189 | 192 |
| Elongation (%) | 410 | 380 | 370 | 390 | 350 |
| 300 % Modulas(kg/cm$^2$) | 136 | 149 | 168 | 155 | 165 |
| Permanent elongation(%) | 14 | 28 | 47 | 55 | 51 |
| State of whitening on stretching | Not whitened | NOt whitened | Not whitened | Not whitened | Not whitened |

The graft copolymers obtained in Examples 49–53 exhibited good rubbery elasticity without necessity of elimination of a homopolymer by extraction and were not whitened even when the copolymers were stretched to more than half valves of break-down elongation.

COMPARATIVE EXAMPLES 1–2

A graft polymerization was carried out in a manner similar to that described in Examples 49–53 except that toluene, Esprene 505, methyl methacrylate and benzoyl peroxide were used in amounts as shown in the table, and the results as shown in the table were obtained.

Table 10

| Comparative Example Nos. | 1 | 2 |
|---|---|---|
| Toluene (parts) | 870 | 870 |
| Esprene 505 (parts) | 80 | 100 |
| MMA (parts) | 80 | 100 |
| BPO (parts) | 3.2 | 4.0 |
| Polymerization temperature (°C) | 80 | 80 |
| Polymerization time (Hr.) | 5 | 5 |
| Concentration of Esprene 505 solution (g/liter) | 80 | 100 |
| MMA/Espene 505 ratio | 1.0 | 1.0 |
| Tensile strength (kg/cm$^2$) | 129 | 162 |
| Elongation (%) | 600 | 510 |
| 300 % Modulas (kg/cm$^2$) | 62 | 94 |
| Permanent elongation (%) | 20 | 15 |
| State of whitening on stretching | considerably whitened | considerably whitened |

Even in the event the ratio of MMA/Esprene 505 was 1.0 as in the case of Examples 49–53, the products of these Comparative Examples wherein the concentration of Esprene 505 solution was less than 120 g/liter were considerably whitened at the time of stretching.

EXAMPLES 54–57

A graft copolymerization was carried out in a manner similar to that described in Examples 49–53 except that toluene, Esprene 505, methyl methacrylate and benzoyl peroxide were used in amounts as shown in the table, and the results as shown in the same table were obtained.

Table 11

| Example Nos. | 54 | 55 | 56 | 57 |
|---|---|---|---|---|
| Toluene (parts) | 870 | 870 | 870 | 870 |
| Esprene 505 (parts) | 140 | 160 | 180 | 200 |
| MMA (parts) | 112 | 128 | 144 | 160 |
| BPO (parts) | 4.48 | 5.12 | 5.76 | 6.40 |
| Polymerization temperature (°C) | 80 | 80 | 80 | 80 |
| Polymerization time (Hr) | 5 | 5 | 5 | 5 |
| Concentration of Esprene 505 solution (g/liter) | 140 | 160 | 180 | 200 |
| MMA/Esprene 505 radio | 0.8 | 0.8 | 0.8 | 0.8 |
| Tensile strength (kg/cm$^2$) | 198 | 200 | 173 | 179 |
| Elongation (%) | 500 | 490 | 470 | 400 |
| 300 % Modulas (kg/cm$^2$) | 119 | 122 | 111 | 135 |
| Permanent elongation (%) | 16 | 22 | 33 | 30 |
| State of whitening on stretching | Not whitened | Not whitened | Not whitened | Not whitened |

The above table obviously shows that so far as the concentration of Esprene 505 in its solution is 140 g/liter or higher, the resulting graft copolymer is not whitened at the time of stretching even in the case of the ratio of MMA/Esprene 505 being 0.8. This graft copolymer is low in a permanent elongation and exhibits good rubbery elasticity without necessity of vulcanization.

EXAMPLES 58–61

A graft copolymerization was carried out in a manner similar to that described in Examples 49–53 except that toluene, Esprene 505, methyl methacrylate and benzoyl peroxide were used in amounts shown in Table 12, and the results as shown therein were obtained.

COMPARATIVE EXAMPLES 3–6

A graft polymerization was carried out similarly except that the amounts of the reactants and solvent were as shown in Table 12. The results are also shown in Table 12 for comparison.

Table 12

| Example Nos. | 58 | 59 | 60 | 61 | Comparative Examples | | | |
|---|---|---|---|---|---|---|---|---|
| | | | | | 3 | 4 | 5 | 6 |
| Toluene (parts) | 870 | 870 | 870 | 870 | 870 | 870 | 870 | 870 |
| Esprene 505 (parts) | 140 | 160 | 180 | 200 | 140 | 160 | 180 | 200 |
| MMA (parts) | 84 | 96 | 108 | 120 | 56 | 64 | 72 | 80 |
| BPO (parts) | 3.36 | 3.84 | 4.32 | 4.80 | 2.24 | 2.56 | 2.88 | 3.20 |
| Polymerization temperature (°C) | 80 | 80 | 80 | 80 | 80 | 80 | 80 | 80 |
| Polymerization time (hrs.) | 5 | 5 | 5 | 5 | 5 | 5 | 5 | 5 |
| Concentration of Esprene 505 solution (g/liter) | 140 | 160 | 180 | 200 | 140 | 160 | 180 | 200 |
| MMA/Esprene 505 ratio | 0.6 | 0.6 | 0.6 | 0.6 | 0.4 | 0.4 | 0.4 | 0.4 |
| Tensile strength (kg/cm$^2$) | 164 | 152 | 130 | 139 | 114 | 108 | 116 | 108 |
| Elongation (%) | 680 | 650 | 590 | 540 | 1010 | 940 | 930 | 870 |
| 300 % Modulas (kg/cm$^2$) | 32 | 40 | 57 | 69 | 15 | 14 | 15 | 18 |

Table 12-continued

| Example Nos. | 58 | 59 | 60 | 61 | Comparative Examples | | | |
| --- | --- | --- | --- | --- | --- | --- | --- | --- |
| | | | | | 3 | 4 | 5 | 6 |
| Permanent elongation (%) | 22 | 22 | 27 | 25 | 52 | 47 | 41 | |
| State of whitening on stretching | Not whitened | NOt whitened | NOt whitened | Not whitened | Slightly whitened | Slightly whitened | Not whitened | Not whitened |

As seen in the case of Examples 58–61, the graft copolymers prepared under the condition that the concentration of Esprene 505 is at least 140 g/liter are not whitened at the time of stretching even in the case of the ratio of MMA/Esprene 505 being 0.6. These graft copolymers are low in permanent elongation and exhibit good rubbery elasticity without necessity of vulcanization.

As seen in Comparative Examples 3–6, the graft copolymers prepared under the condition that the ratio of MMA/Esprene 505 is 0.4 are poor in tensile strength and increase in elongation so that the graft copolymers become unvulcanized rubber, even if the concentration of Esprene 505 in its toluene solution is 140 g/liter or high. In addition, a part of the resulting graft copolymers are whitened at the time of stretching.

EXAMPLES 62–65

A graft copolymerization was carried out in the same manner as described in Examples 49–53 except that toluene, Esprene 505, methyl methacrylate and benzoyl peroxide were used in amounts as shown in Table 13, and the results as shown therein were obtained.

COMPARATIVE EXAMPLES 7–14

A graft polymerization was carried out similarly except that the amounts of the reactants and solvent were as shown in Table 14. The results are also shown in Table 14 for comparison.

Table 13

| Example Nos. | 62 | 63 | 64 | 65 |
| --- | --- | --- | --- | --- |
| Toluene (parts) | 870 | 870 | 870 | 870 |
| Esprene 505 (parts) | 140 | 160 | 180 | 200 |
| MMA (parts) | 168 | 192 | 216 | 240 |
| BPO (parts) | 6.72 | 7.68 | 8.64 | 9.60 |
| Polymerization temperature (°C) | 80 | 80 | 80 | 80 |
| Polymerization time (hrs.) | 5 | 5 | 5 | 5 |
| Concentration of Esprene 505 solution (g/liter) | 140 | 160 | 180 | 200 |
| MMA/Esprene 505 ratio | 1.2 | 1.2 | 1.2 | 1.2 |
| Tensile strength (kg/cm²) | 221 | 209 | 226 | 234 |
| Elongation (%) | 330 | 350 | 310 | 350 |
| 300 % Modulas (kg/cm²) | 203 | 191 | 204 | 207 |
| Permanent elongation (%) | 58 | 70 | 67 | 81 |
| State of whitening on stretching | Not whitened | Not whitened | Not whitened | Not whitened |

Table 14

| Example Nos. | Comparative Examples | | | | | | | |
| --- | --- | --- | --- | --- | --- | --- | --- | --- |
| | 7 | 8 | 9 | 10 | 11 | 12 | 13 | 14 |
| Toluene (parts) | 870 | 870 | 870 | 870 | 870 | 870 | 870 | 870 |
| Esprene 505 (parts) | 140 | 160 | 180 | 200 | 140 | 160 | 180 | 200 |
| MMA (parts) | 224 | 256 | 288 | 320 | 280 | 320 | 360 | 400 |
| BPO (parts) | 8.96 | 10.24 | 11.52 | 12.80 | 11.20 | 12.80 | 14.40 | 16.00 |
| Polymerization temperature (°C) | 80 | 80 | 80 | 80 | 80 | 80 | 80 | 80 |
| Polymerization time (hrs.) | 5 | 5 | 5 | 5 | 5 | 5 | 5 | 5 |
| Concentration of Esprene 505 solution (g/liter) | 140 | 160 | 180 | 200 | 140 | 160 | 180 | 200 |
| MMA/Esprene 505 ratio | 1.6 | 1.6 | 1.6 | 1.6 | 2.0 | 2.0 | 2.0 | 2.0 |
| Tensile strength (kg/cm²) | 215 (172) | 209 (189) | 185 (217) | 204 (227) | 200 (270) | 195 (272) | 203 (287) | 229 (313) |
| Elongation (%) | 320 | 300 | 180 | 210 | 150 | 130 | 70 | 50 |
| 300 % Modulas (kg/cm²) | 179 | 209 | — | — | — | — | — | — |
| Permanent elongation (%) | 113 | 110 | 69 | 72 | 53 | Not measurable | Not measurable | Not measurable |
| State of whitening on stretching | Considerably whitened | Considerably whitened | Considerably whitened | Considerably whitened | Considerably whitened | Considerably whitened | Considerably whitened | Considerably whitened |

Remarks: The values in parentheses show yielding tensile strength.

The results of Examples 62–65 obviously shows that when the concentration of Esprene 505 in its toluene solution is 140 g/liter or higher, a hard graft copolymer which is not whitened at the time of stretching and has a rubbery elasticity without necessity of vulcanization can be obtained even in the case of the weight ratio of MMA/Esprene 505 being 1.2. In contrast, the results of Comparative Examples 7–14 teaches that when the ratio of MMA/Esprene 505 is 1.6 or 2.0, a stress-strain curve shows a resinous property which has a yielding point in tensile strength and the graft copolymer is high in permanent elongation and low in elongation and thus is considerably whitened at the time of stretching, even if the concentration of Esprene 505 in its toluene solution is 140 g/liter or higher.

What is claimed is:

1. A generally transparent, rubbery elastomeric graft copolymer consisting essentially of an ethylene/propylene/nonconjugated diene terpolymer backbone and a graft polymerized moiety consisting essentially of lower alkyl methacrylate in a weight ratio of 0.1–20, said graft copolymer being free of ungrafted polymer.

2. A graft copolymer according to claim 1 wherein said lower alkyl methacrylate is methyl methacrylate.

3. A coating agent comprising the graft copolymer of claim 1.

4. An adhesive comprising the graft copolymer of claim 1.

5. The graft copolymer of claim 1 wherein the weight ratio of backbone terpolymer and graft moiety is in the range of about 0.6–1.2.

6. A graft copolymer according to claim 1 wherein said ethylene/propylene/non-conjugated diene terpolymer is a terpolymer of ethylene, propylene and a derivative of norbornene selected from the group consisting of 5-methylene-2-norbornene, 5-ethylidene-2-norbornene, 2,5-norbornadiene and 2-methyl-2,5-norbornadiene.

7. A process for producing a generally transparent, rubbery elastomeric graft copolymer which comprises graft polymerizing a monomer consisting essentially of a lower alkyl methacrylate to an ethylene/propylene/non-conjugated diene terpolymer in a weight ratio of 0.1–20 in the presence of a sufficient amount of a radical polymerization initiator and an inert organic solvent, recoverging the polymerization product and extracting any ungrafted polymer from said product to leave said graft copolymer.

8. A process according to claim 7 wherein the weight ratio of said lower alkyl methacrylate monomer to said ethylene/propylene/non-conjugated diene terpolymer is 0.6–1.2 and the concentration of said terpolymer in the solution is at least 120 g/liter.

9. A process according to claim 7 wherein said lower alkyl methacrylate is methyl methacrylate.

10. A process according to claim 7 wherein said radical polymerization initiator is benzoyl peroxide.

11. A process according to claim 7 wherein said organic solvent is toluene.

12. A graft copolymer according to claim 7 wherein said ethylene/propylene/non-conjugated diene terpolymer is a terpolymer of ethylene, propylene and a derivative of norbornene selected from the group consisting of 5-methylene-2-norbornene, 5-ethylidene-2-norbornene, 2,5-norbornadiene and 2-methyl-2,5-norbornadiene.

* * * * *

UNITED STATES PATENT AND TRADEMARK OFFICE
CERTIFICATE OF CORRECTION

PATENT NO. : 3,981,958
DATED : September 21, 1976
INVENTOR(S) : Kunihiko Nakashima et al It is certified that error appears in the above-identified patent and that said Letters Patent are hereby corrected as shown below:

In the heading the Foreign Application Priority Data should read as follows:

-- [30]  Foreign Application Priority Data

| | | |
|---|---|---|
| Apr. 19, 1973 | Japan | 48-43669 |
| May 10, 1973 | Japan | 48-51170 |
| Nov. 30, 1973 | Japan | 48-133612 --. |

Signed and Sealed this

Sixteenth Day of November 1976

[SEAL]

Attest:

RUTH C. MASON
*Attesting Officer*

C. MARSHALL DANN
*Commissioner of Patents and Trademarks*